United States Patent [19]
Callis et al.

[11] 3,950,611
[45] Apr. 13, 1976

[54] GATED VIDEO CENTROID TRACKER

[75] Inventors: James W. Callis, Manhattan Beach; William A. Chambers, Torrance, both of Calif.

[73] Assignee: Hughes Aircraft Company, Culver City, Calif.

[22] Filed: Nov. 22, 1966

[21] Appl. No.: 596,142

[52] U.S. Cl. ...... 178/6.8; 178/DIG. 21; 250/203 CT
[51] Int. Cl.² .......................................... H04N 3/00
[58] Field of Search .......... 178/6, 7.6, 6.8, DIG. 21; 343/114, 7.4; 250/203, 203 CR, 203 CT

[56] References Cited
UNITED STATES PATENTS

| | | | |
|---|---|---|---|
| 3,043,907 | 7/1962 | Martin | 178/6.8 |
| 3,120,578 | 2/1964 | Potter et al. | 178/6.8 |
| 3,161,725 | 12/1964 | Hotham | 250/203 CT |
| 3,240,942 | 3/1966 | Birnbaum et al. | 250/203 CT |
| 3,257,505 | 6/1966 | Van Wechel | 178/DIG. 21 |
| 3,320,360 | 5/1967 | Thompson | 178/6.8 |
| 3,541,246 | 11/1970 | Goldfischer | 178/DIG. 21 |
| 3,541,249 | 11/1970 | Chambers et al. | 178/DIG. 21 |
| 3,714,373 | 1/1973 | Kuhn | 178/DIG. 21 |
| 3,725,576 | 4/1973 | Crawford et al. | 178/DIG. 21 |
| 3,769,456 | 10/1973 | Woolfson | 178/DIG. 21 |

Primary Examiner—Maynard R. Wilbur
Assistant Examiner—H. A. Birmiel
Attorney, Agent, or Firm—W. H. MacAllister; Martin E. Gerry

[57] ABSTRACT

A video tracking system that produces voltages representative of the location of a designated target relative to the tracking axis of a transducer. An error detector unit compares the position of a target, of selected intensity contrast, to that of a tracking gate and updates the gate position to track the target. The error detector unit includes a combination of two integrators coupled in series with two or more gate circuits that are synchronized with the tracking gate. The tracking response characteristic may be selected for optimum performance with expected target profiles by variation of the relative signal gain and timing of the gate circuits.

11 Claims, 15 Drawing Figures

FIG. 6.

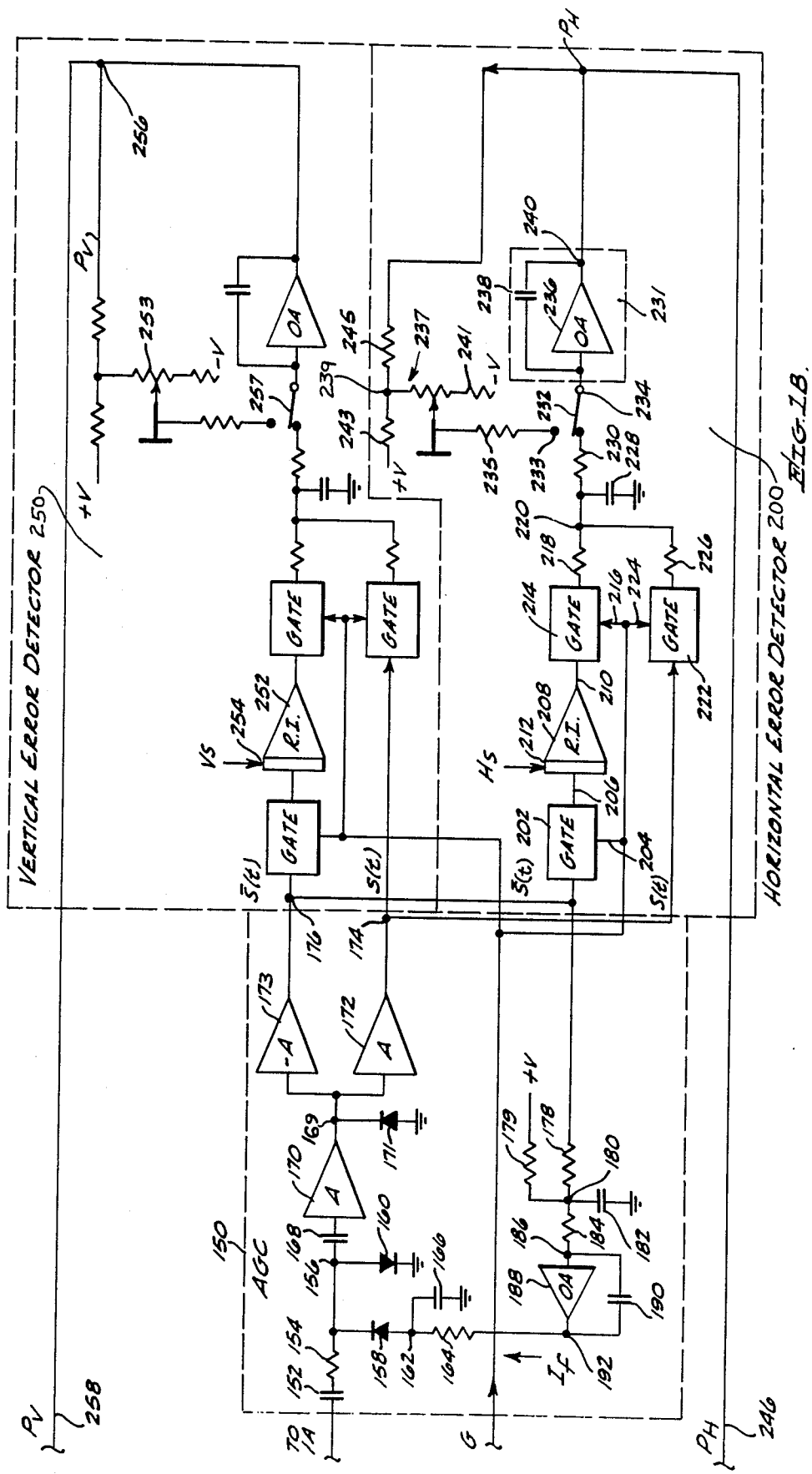

RESET INTEGRATOR

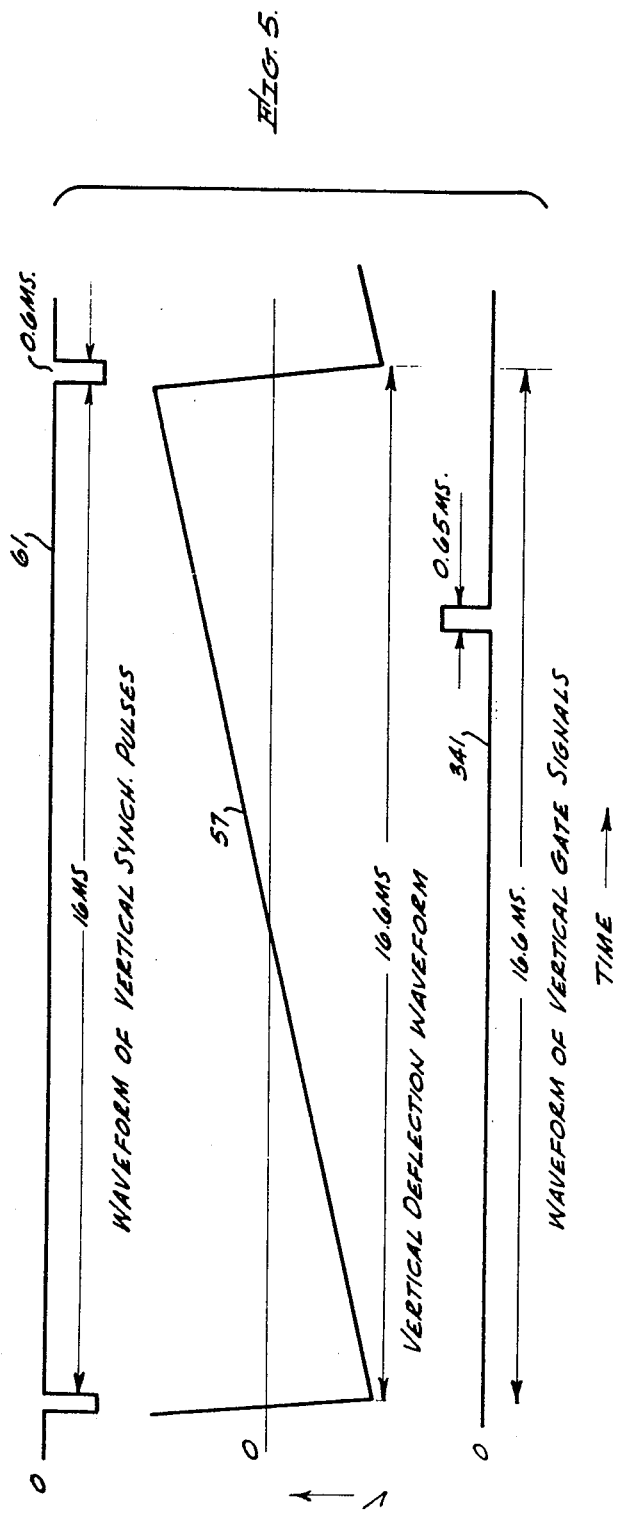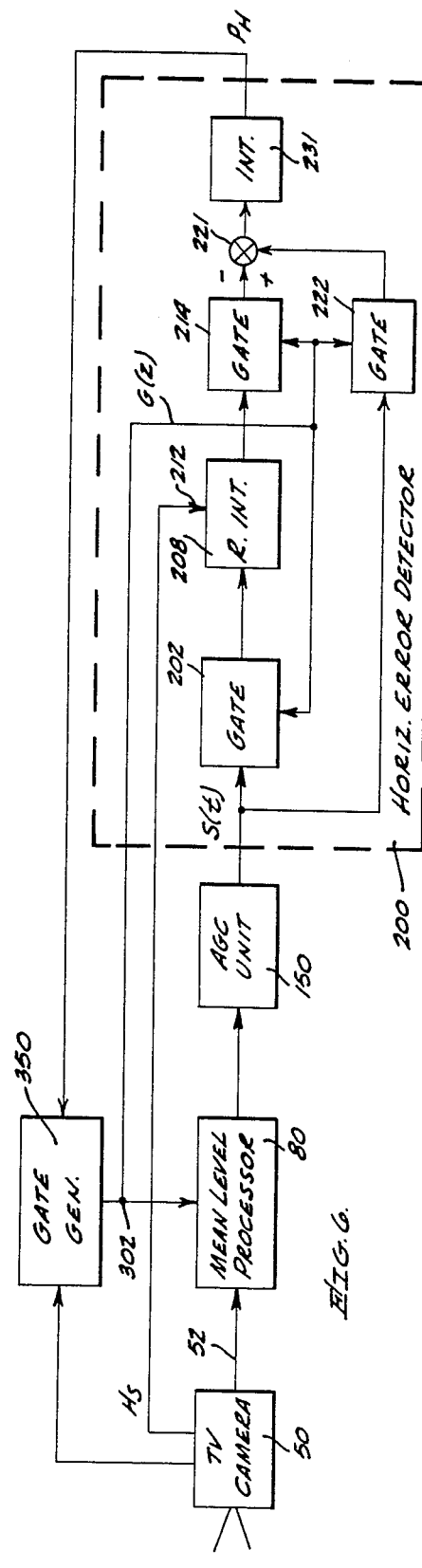

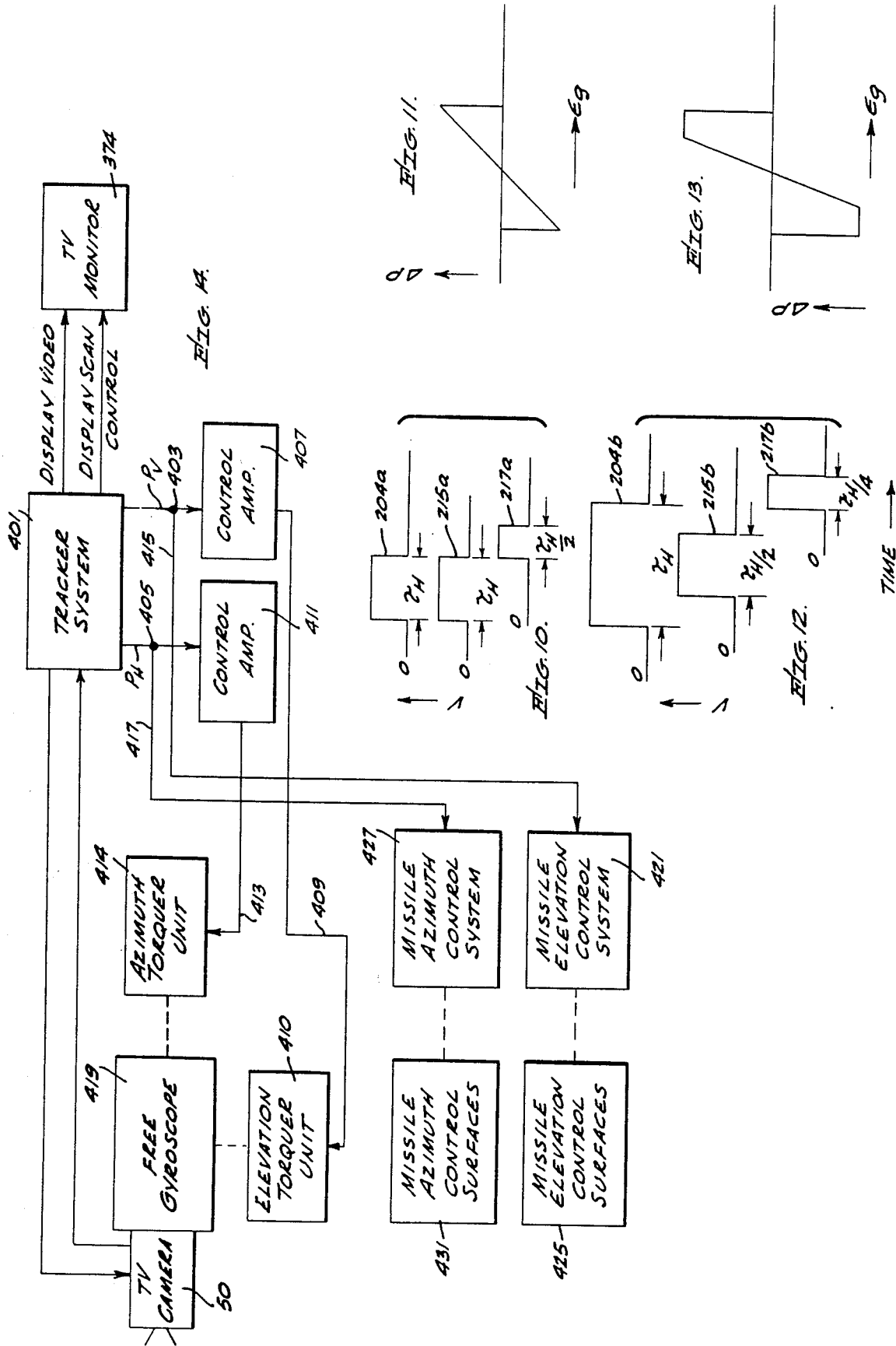

GATED VIDEO CENTROID TRACKER

This invention relates generally to tracking systems and particularly to video tracking systems having improved accuracy and stability.

Tracking systems broadly comprise the circuit means for providing voltages representative of the location of a designated object relative to the field of view of a sensor. Systems of this general nature have usually been mechanized so as to compare gated energy on alternate sides of a tracking reference (area balance systems), or to compare the positions of the leading and trailing edges of gated signals relative to a tracking reference position (contrast gradient systems). Although such systems have been found satisfactory for many applications, the accuracy and stability of these trackers become marginal for operations involving large variations in target area. Also false targets (clutter signals) of both high to low and low to high intensity level transitions have adverse effects on the performance of prior trackers.

It is therefore an object of this invention to provide a tracking system which is stable and accurate.

It is a further object of this invention to provide a tracking system which possesses stable tracking error determining characteristics over large variations in size of target profiles.

It is a still further object of this invention to provide a tracking system with improved clutter rejection capabilities.

It is another object of this invention to provide a tracking system which maintains an improved aiming point relative to the target center.

The aforesaid and other objects and advantages are accomplished according to the present invention in a tracking system that utilizes a transducer including a sensor located at the image plane of an optic system. The sensor is responsive to energy received from a sector in space and is sequentially scanned by an output circuit of the transducer to develop area signals that are amplitude representative of the relative intensity of the received energy. The tracker portion of one embodiment of the system, in accordance with the principles of this invention, measures the deviation of the centroid of processed area signals (the center of gravity of a designated image on the sensor) from a tracker frame of reference, such as display crosshairs or tracker gate position, and makes corrections to the position of this tracker reference to null that distance. The position voltages, which are the analog of the tracker reference positions, are then representative of the location of the object image on the sensor and thus the position of the object in the coordinate system of the transducer. Any change in the relative position of the designated object due to motion between sensor and the object is detected and the position voltages are quickly and accurately updated to provide effective tracking.

The tracker portion of the system in accordance with the principles of this invention may include a mean level processor, an automatic gain control (AGC) means, a gate generator and a pair of centroid error detectors.

The position output signals of the tracker are coupled to the gate generator and control the timing of the gating signals relative to the transducer scan pattern. Area signals which are developed by the output circuit of the transducer are coupled to an input circuit of the mean level detector wherein the area signals are gated in response to gating signals developed by the gate generator. The DC (Direct Current) level of the gated area signals is eliminated in the mean level processor by developing a correction signal equal to the average value of the gated area signals and subtracting the correction signal from the area signals. The resultant signals are processed by an output circuit of the mean level processor which allows selection of signal polarity so that only signals of the same intensity contrast as the target are processed by the input circuit of the AGC means. The selected polarity output signals of the means level processor are amplified, thresholded and normalized in the AGC unit such that the integral of the output signal of the AGC unit is maintained at a predetermined constant value. These output signals of the AGC unit are then coupled to input circuits of two centroid error detectors (one detector for each tracking dimension). According to one practical embodiment of this invention the centroid error detector includes two parallel circuits, one circuit coupling the input signal to a summation filter and the other circuit integrating the input signal prior to coupling the integrated signal through a gating circuit to the summation filter. The output voltage of the summation filter is coupled to a second integrator which develops the position voltages representative of the relative location of the centroid of the target. According to another practical embodiment of this invention the centroid error detector includes a gated first integrator circuit coupling the input circuit of the error detector to a pair of gating circuits. The output voltages of the gating circuits are subtracted in an input circuit of a second integrator, which develops the position voltages representative of the relative location of the centroid of the target.

The novel features which are believed to be characteristic of the invention both as to its organization and method of operation, together with further objects and advantages thereof, will be better understood from the following description considered in connection with the accompanying drawings in which like characters refer to like parts and in which:

FIGS. 1A and 1B are block and circuit diagrams showing the tracking system in accordance with this invention;

FIGS. 4 and 5 are diagrams of voltage vs. time waveforms for explaining the operation of the system in accordance with the invention;

FIG. 6 is a block diagram for further explaining one embodiment of the error detector in accordance with this invention;

FIG. 10 is a diagram of waveforms time as a function of voltage for explaining the gate timing sequence for the error detector of FIG. 9;

FIG. 11 is an impulse error curve corresponding to the error detector of FIG. 9 and the gating sequence of FIG. 10;

FIG. 12 is a diagram of waveforms showing a second gate timing sequence for the error detector of FIG. 9;

FIG. 13 shows an impulse error curve corresponding to the error detector of FIG. 9 and the gating sequence of FIG. 12; and FIG. 14 is a functional block diagram showing a guidance system incorporating the principles in accordance with the invention.

Figure 1A:
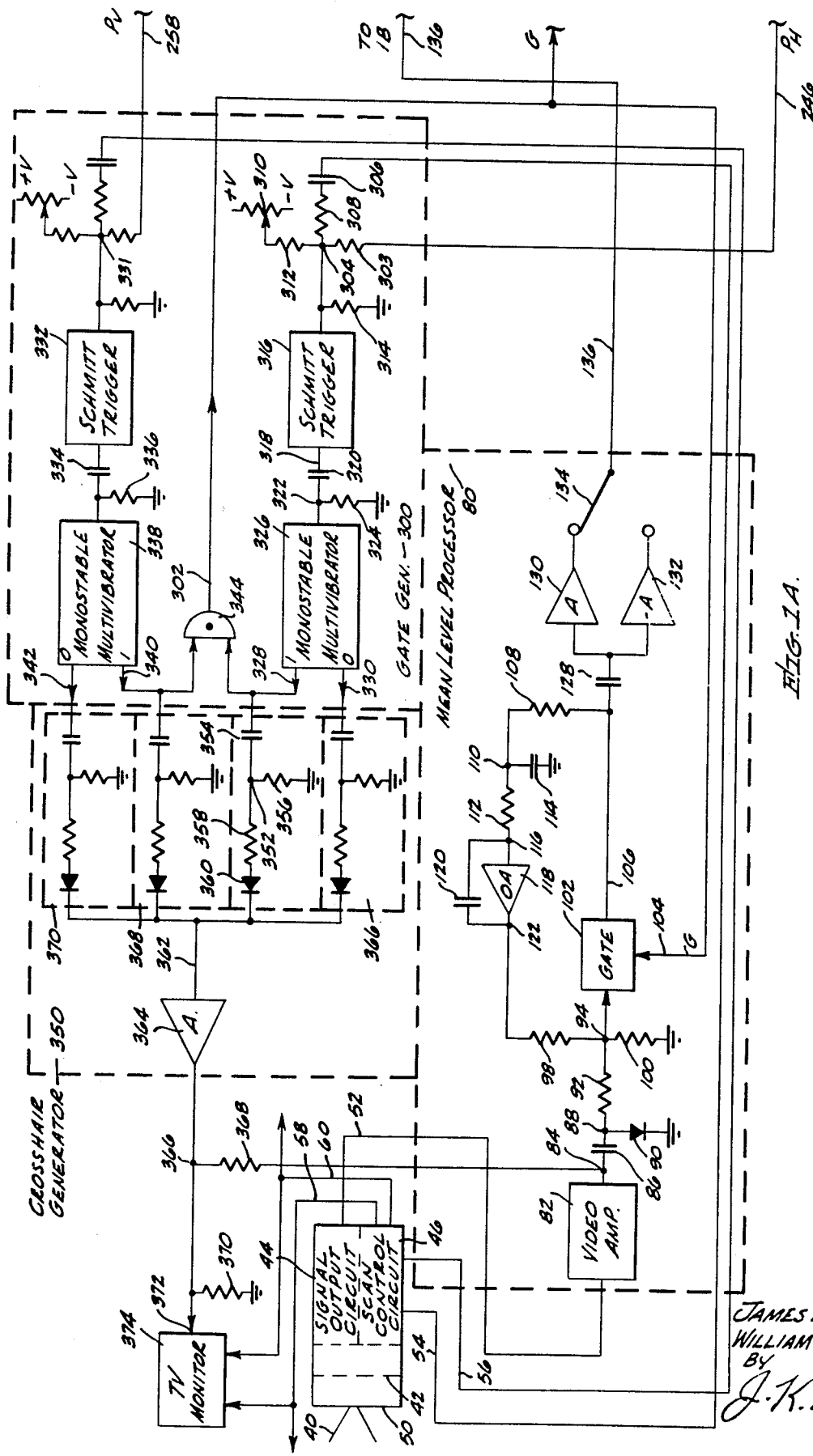

Referring first to FIGS. 1A and 1B, a TV (television) camera 50, which may be a conventional vidicon unit, includes an optical network 40 for forming images on a sensor 42 in response to energy received from a sector of space. A signal output circuit 44 of TV camera 50 develops video signals at a terminal 52, which are amplitude representative of the energy received by increments of area of sensor 42 as the sensor is scanned by output circuit 44. The scan pattern of the output circuit 44 is controlled in a conventional TV scan pattern by a scan control circuit 46 that also provides horizontal and vertical deflection signals at output terminals 54 and 56 respectively and for providing horizontal and vertical synchronization (sync) signals at output terminals 58 and 60 respectively.

The video signals at terminal 52 of TV camera 50 are amplified by a conventional video amplifier 82, which is the input stage of a mean level processor 80, and the output signals of the amplifier 82 are applied to an output terminal 84. These amplified video signals at terminal 84 are AC (alternating current) coupled by a capacitor 86 to a junction 88. A suitable conventional diode 90 has an anode connected to the junction 88 and a cathode connected to a suitable fixed reference potential such as ground. The diode 90 in conjunction with the capacitor 86 and the outut impedance of video amplifier 82 forms a conventional DC restorer or clamp circuit. The purpose of the clamp circuit is to maintain a predetermined DC level at the junction 88 substantially independent of level variations in the video signals at the output terminal 84. The potential at junction 88 is coupled through a resistor 92 to a junction 94. A signal at a junction 122, which will be described subsequently, is applied through a resistor 98 to the junction 94 and is then summed across a resistor 100 with the potential applied through the resistor 92. The signal at the terminal 94 is gated by a conventional video gating circuit 102 in response to gating pulses applied to a terminal 104 of the gating circuit 102 from an output terminal 302 of a gate generator 300. The circuit for providing these gating pulses will be described in a later portion of the specification, but for now it may be assumed that the gating pulses are approximately coincident in time with the area signals, representative of a designated object image on the sensor 42 of the TV camera 50. Subsequent description will explain how the acquisition and tracking operation of the system in accordance with the principles of this invention will justify the aforestated assumption.

The output signal of the gating circuit 102 at a terminal 106 is coupled through a resistor 108 to a circuit junction point 110 which is jointly coupled to a resistor 112, a capacitor 114 and the resistor 108. The capacitor 114 is connected between said junction 110 and ground and the resistor 112 is coupled between the junction point 110 and an input terminal 116 of a conventional operational amplifier 118. A capacitor 120 is connected across the input terminal 116 and an output terminal 122 of the operational amplifier 118 to form an integrator configuration. The function of the just described feedback circuit, which circuit couples a portion of the signal at the output terminal 106 of the gate 102 to the input terminal 94, is to eliminate the DC value of the gate video signals at the output terminal 106.

The response time of the filter combination of resistor 108 and capacitor 114 is made much longer (1 millisecond for example) than the total gating period (20 microseconds for example) of one frame so that the net charge added to or subtracted from capacitor 144 through resistor 108 and gate 102 during one frame will be proportional to the mean level of video appearing within the gate on that frame. The response time of the filter combination of resistor 112 and capacitor 114 is made intermediate (5 milliseconds for example) between the duration of a vertical gate period (650 microseconds for example) and a frame period (16.6 milliseconds for example) so that capacitor 114 will discharge very little during a vertical gate period but capacitor 114 will discharge almost completely before the next succeeding vertical gate period.

Since junction 116 is a virtual ground and amplifier 118 has a high input impedance, the change in charge on capacitor 120 from one total gate period to the next will be substantially equal to the net charge added to or subtracted from capacitor 114 during the first gate period. Thus the change in voltage at junction 122 between gate periods will be inversely proportional to the value of capacitor 120 and proportional to the mean level of video within the gate of the preceding frame. This permits setting the closed loop response time of the mean level processor 80 to the optimum value (0.5 second for example) for a particular system application by choosing the appropriate value for capacitor 120. A frame is defined as the period of time during which the output circuit of said TV camera 50 is making one complete scan of the sensor. Therefore the feedback circuit between the output and input terminals of the gate 102 develops a voltage equal to the average value of the gated video and subtracts this voltage from the video signal coupled through the resistor 92.

The gated video signals at the output terminal 106 of the gate 102 are applied through a capacitor 128 to input circuits of conventional video amplifiers 130 and 132. The phase of the output signal of the amplifier 130 is the same as that of the input signal and the phase of the output signal of the amplifier 132 is of opposite or inverted phase from that of the input signal. A suitable switch such as a mechanical switch 134 allows the selection of the output signal of either amplifier 130 or 132. The output terminal of switch 134 is coupled through a lead 136 to a capacitor 152 which is an input element of an AGC unit 150. The gated video signals applied to the capacitor 152 are amplified, normalized and thresholded within the AGC unit.

The signals applied through the capacitor 152 produce a voltage at a junction 156 which is a function of the relative impedance of a resistor 154, and a pair of conventional diodes 158 and 160. The resistor 154 is connected between the capacitor 152 and the junction 156 and the diode 158 has a cathode connected to the junction 156 and an anode coupled to a junction 162. Also connected to the junction 156 is an anode terminal of the diode 160 which has its cathode terminal connected to ground. A capacitor 166 is coupled between the junction 162 and ground to provide an AC signal path from junction 156 through diode 158 to ground. A low frequency current $I_f$ is applied through a resistor 164 and through the diodes 158 and 160 to ground, the value of $I_f$ determining the bias point and the impedance of these diodes. As the value of $I_f$ is varied, the percentage of the signal coupled from capacitor 152 to the junction 156 also varies. Thus the gain of the gated video signals may be regulated by controlling the value of $I_f$.

The gated area signals at the junction 156 are applied through a capacitor 168 to a conventional amplifier 170 which has an output terminal 169 coupled to an cathode of a conventional diode 171 the anode of which is connected to ground. The diode 171 essentially shorts the negative voltage portions of the output signal of the amplifier 170 to ground while the positive voltage portions of the output signal are coupled to the input terminals of a pair of conventional amplifiers 173 and 172. The phase of the output signal of amplifier 172 at a terminal 174 is the same as the phase of the input signal to the amplifier 172 and the phase of the output signal of the amplifier 173 at a terminal 176 is the complement of the input signal applied to said amplifier 173.

The signal at the terminal 176, $\overline{S}(t)$, is coupled through a resistor 178 to a junction 180, and a suitable positive voltage source is coupled through a resistor 179 to junction 180. A capacitor 182 is coupled between the junction 180 and ground and a resistor 184 is connected between the junction 180 and the input terminal 186 of a conventional operational amplifier 188. A capacitor 190 is coupled across the input terminal 186 and the output terminal 192 of the operation amplifier 188 to form an integrator configuration. The output signal at the terminal 192 is the current $I_f$ which regulates the gain of the input stage of the AGC unit 150 in such a manner that the integral of the signal $S(t)$ at the terminal 176 is maintained at a predetermined constant value. In the feedback loop between terminals 176 and 162, that was just described, elements 178 and 182 may be considered as one filter section, elements 184, 188 and 190 as a second filter and elements 164 and 166 as a third filter. The relative time response of these filters is determined by the same considerations as described for the corresponding filter sections in the feedback loop around the gate 102.

The signal $\overline{S}(t)$ at the terminal 176, is coupled to the input of a conventional video gate 202, which is a part of an input circuit of a horizontal error detector unit 200. The gating signal at the terminal 302 of the gate generator 300 is coupled to a gate input terminal 204 of the gate 202. In response to this gating signal, the gate 202 passes the signal $\overline{S}(t)$ to an input terminal 206 of a reset integrator 208. The output signal of the reset integrator 208, at a terminal 210, is the integral of the gated signal $\overline{S}(t)$ at the terminal 206. As will be explained subsequently, the gain constant of the integrator 208 is equal to $2/\tau H$ where $\tau H$ is the time period of the horizontal gating pulses applied to the integrator from the terminal 302 of the gate generator 300. This output signal of the reset integrator 208 is clamped to ground potential, for example, at the start of each horizontal scan, by the horizontal sync. pulses ($H_s$) coupled to a terminal 212 from the output terminal 58 of the TV camera 50. Any suitable reset integrator may be used for the circuit 208, and one such integrator that has proven satisfactory is shown in FIG. 2.

Figure 2:
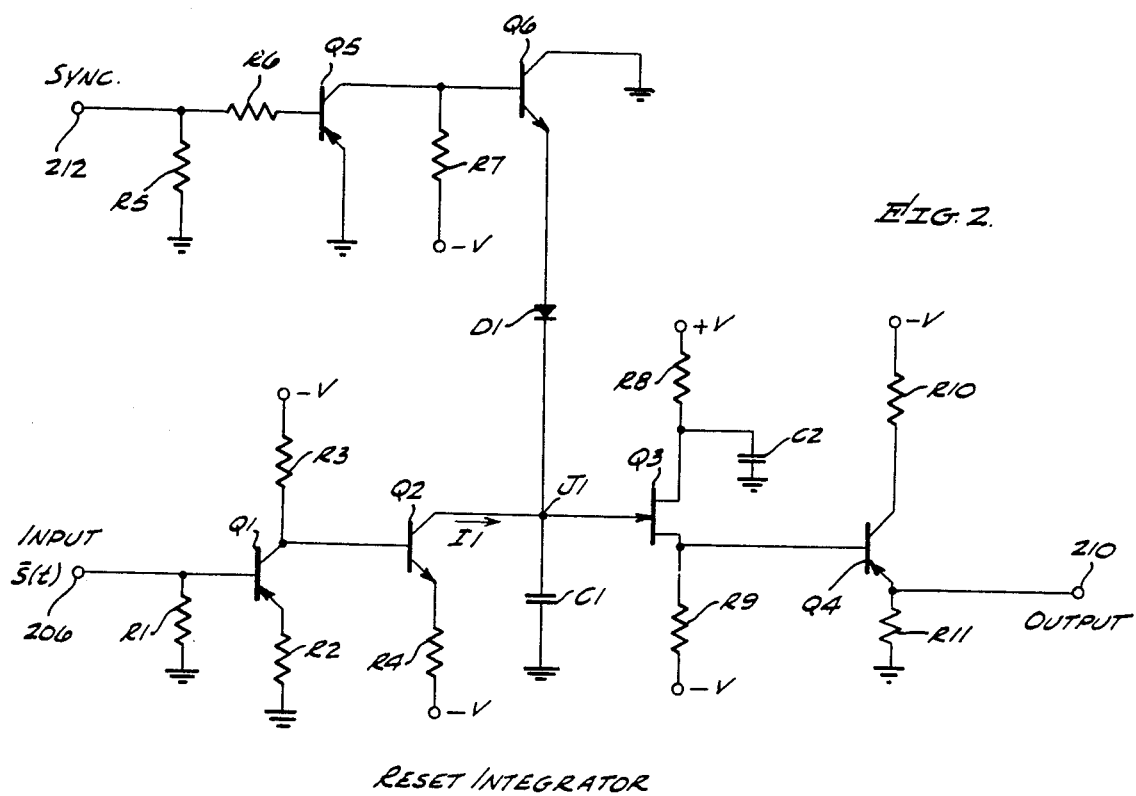
FIG. 2 is a schematic diagram of a suitable integrator circuit for the system of FIGS. 1A and 1B.

Referring now to FIG. 2, the signal $\overline{S}(t)$ is coupled to the input terminal 206 which is connected to a base terminal of a conventional p-n-p transistor Q1, which may be a type 2N1132 for example. The input terminal 206 is also coupled through a resistor R1 to ground. Transistor Q1 has an emitter terminal coupled through a resistor R2 to ground and a collector terminal coupled through a resistor R3 to a suitable negative DC voltage supply. The amplified signal $\overline{S}(t)$ is coupled from the collector of the transistor Q1 to a base terminal of a conventional n-p-n transistor Q2, of a 2N1711 type for example. An emitter terminal of the transistor Q2 is coupled through a resistor R4 to a suitable negative DC voltage supply, and a collector terminal of the transistor Q2 is connected to a junction J1. A capacitor C1 is coupled between the junction J1 and ground. The current I1, that is generated by the transistor Q2, is directly proportional to the voltage of the signal coupled to the input terminal 206 and therefore the potential across the capacitor C1 is the integral of the input voltage $\overline{S}(t)$. The sync. pulses when applied to the terminal 212 develops a voltage across a resistor R5 which is coupled between the terminal 212 and ground, which voltage is applied through a resistor R6 to a base terminal of a conventional p-n-p transistor Q5, of a 2N1132 type for example. An emitter terminal of the transistor Q5 is connected to ground and a collector terminal is connected through a resistor R7 to a suitable negative DC voltage supply. The collector terminal of the transistor Q5 is also coupled to a base terminal of a conventional n-p-n transitor Q6, of a 2N1711 type for example. A collector terminal of the transistor Q6 is connected to ground and an emitter terminal of the transistor Q6 is coupled to an anode terminal of a conventional diode D1. The cathode of the diode D1 is connected to the junction J1. In operation, the capacitor C1 is charged to a negative potential by the current I1 during the time period between horizontal sync. pulses and upon the application of the sync. pulse to terminal 212 the current from the collector terminal of the transistor Q5 drives the transistor Q6 into saturation and capacitor C1 is discharged through the low impedance of the dioide D1 and transistor Q6 to ground. The voltage at the junction J1 is applied to a gate terminal of a field effect transistor Q3, of a TA2330 type for example, which possesses an high input impedance. A drain terminal of the transistor Q3 is coupled through a resistor R8 to a suitable positive voltage supply and through a capacitor C2 to ground. A resistor R9 is connected between a suitable negative voltage supply and a source terminal of the transistor Q3, which source terminal is also coupled to a base terminal of a conventional p-n-p transistor Q4 of a 2N1132 type, for example. The collector of the transistor Q is coupled through a resistor R10, to a suitable negative voltage supply and an emitter terminal of the transistor Q4 is coupled through a resistor R11 to ground. The signal at the emitter terminal of the transistor Q4, which is applied to the output terminal 210, is essentially at the same potential as the signal at the junction J1 but transformed to a much lower impedance level.

Referring again to FIGS. 1A and 1B, the signal at the output terminal 210 of the reset integrator 208 is gated by a conventional video gate 214 in response to the gating signal coupled to a terminal 216 from the output terminal 302 of the gate generator 300. The output signal of the gate 214 is coupled through resistor 218 to a summation junction 220. In a similar manner the signal at the terminal 174, S(t), is gated by a conventional video gate 222 in response to the gating signal coupled to a terminal 224. A resistor 226 couples the output signal of gate 222 to the summation junction 220 where the signal is summed with the output signal of the gate 214 across a capacitor 228 which is coupled between the junction 220 and ground. The potential at the junction 220 is applied through a resistor 230 and a switch 232 to an input terminal 234 of a conventional operational amplifier 236. A capacitor 238 is connected between the input terminal 234 and an output terminal 240 of the operational amplifier 236 to form an integrator 231. The potential at the terminal 240 $P_H$, is representative of the location of the centroid of the designated target relative to the horizontal center of the sensor of the TV camera 50.

The voltage $P_H$ is coupled on a lead 246 to a resistor 303 and then to an input junction 304 of the gate generator 300. In addition, the horizontal deflection signal is applied from the terminal 54 of the TV camera 50 through a capacitor 306 and a resistor 308 to the junction point 304. Also a calibration voltage is applied from a wiper terminal of a potentiometer 310 through a resistor 312 to the junction 304. The potentiometer 310 is connected between suitable positive and negative DC voltage supplies. The aforementioned voltages applied through the resistors 303, 308 and 312 are summed across a resistor 314 that is coupled between the terminal 304 and ground. The potential at the junction 304 is applied to an input terminal of a conventional Schmitt trigger circuit 316 and when the potential at the junction 304 exceeds a predetermined voltage level, for example ground potential, the potential at an output terminal 318 of the Schmitt trigger circuit 316 changes from a low level to a high level value. This signal at the terminal 318 is applied through a capacitor 320 to a junction 322. A resistor 324 is coupled between the junction 322 and ground and the signal at that junction is representative of the differential of the signal at the terminal 318. This signal at the terminal 322 is coupled to the input terminal of a conventional monostable multivibrator 326. Each time a positive pulse is applied to the junction 322, the output signal of the multivibrator at an output terminal 328 is a positive pulse of a predetermined time duration, for example 2 microseconds. A signal is also applied to an output terminal 330 of the multivibrator 326 as the complement of the signal at the terminal 328.

A vertical error detector 250 is mechanized substantially the same as the horizontal error detector 200 previously described. However, in the vertical error detector a reset integrator 252 is reset by the vertical sync. pulses ($V_s$) coupled to a terminal 254 from the terminal 60 of the TV camera 50. Also the gain constant of the reset integrator 252 is equal to $2/n\tau_H$ where $\tau_H$ is the horizontal gate time duration period and n is the number of horizontal gates per vertical gate. The output voltage, $P_V$, of the vertical error detector, is applied from an output terminal 256 on a lead 258 to an input junction 331 of the gate generator 300. The signal $P_V$ is representative of the location of the centroid of the target in the vertical dimension of the sensor.

The vertical deflection signal is applied from the terminal 56 of the TV camera 50 to the junction 331 and there summed with the signal $P_V$ in the same manner as described for the summation performed at junction 304. The signal at the junction 331 is processed by a Schmitt trigger circuit 332, a capacitor 334, resistor 336 and a conventional monostable multivibrator 338 substantially as described previously for elements 316, 320, 324 and 326 respectively. The output signal fo the multivibrator 338 at a terminal 340 is at a high level during a predetermined time period, for example 650 M sec (microseconds), and the timing of this signal relative to the scan pattern of TV camera 50 controlled by the position voltage $P_V$. The output signal at the terminal 342 of the multivibrator 338 is the complement of the signal at the terminal 340.

The signals at the output terminal 328 of the multivibrator 326 which are positive horizontal gating signals, are synchronized to the horizontal readout scan of the TV camera 50. The output signals at terminal 340 of the multivibrator 338 which are positive vertical gating signals, are synchronized to the vertical readout scan of the TV camera 50. These horizontal and vertical gating signals are coupled to the input terminals of a conventional AND gate 344. The output gating signal at the terminal 302 is at the high level state only during the period when the signal at the terminals 340 and 328 are simultaneously at the high level states.

The positive horizontal gating signals at the terminal 328 are also applied through a capacitor 354 to an input junction 352 of a crosshair generator 350. A resistor 356 is coupled between the terminal 352 and a ground so that the voltage at the terminal 352 is the differential of the signal at the terminal 328. The positive pulses of the signal at the terminal 352 are applied through a resistor 358 and a conventional diode 360 to an input terminal 362 of a conventional video amplifier 364. The positive pulses passed by the diode 360 are coincident with the leading edges of the horizontal gating signals.

In a similar manner the negative horizontal gating pulses at the terminal 330 are processed by a differentiating circuit 366 to provide positive pulses, coincident with the occurrence of the trailing edges of said horizontal gating signals, which are coupled to said input terminal 362.

The positive vertical gatng signals at the terminal 340 are applied to an input terminal of a differentiating circuit 368 and the output pulses of the circuit 368 are coincident with the leading edges of the vertical gating signals. These output signals of the circuit 368 are also coupled to said input terminal 362. The negative vertical gate signals at the terminal 342 are processed by a differentiating circuit 370 to produce pulses coincident with the trailing edges of the vertical gating signals. The output signals of the circuit 370 are supplied to the input terminal 362. The video amplifier 364 amplifies the signals coupled to the input terminal 362 and applies these amplified signals to a junction 366. The amplified video signals at the terminal 84 are applied through a resistor 368 to the junction 366 where these video signals are combined with the output signal of the amplifier 364 across a summation resistor 370. The resistor 370 is coupled between the junction 366 and ground and the potential at the junction 366 is applied to a signal input terminal 372 of a conventional TV monitor 374.

Also coupled to the TV monitor 374 are the horizontal and vertical sync. signals from the output terminals 58 and 60 respectively of the TV camera 50. The TV monitor 374, as is well known in the art, includes (not shown) a display surface, deflection circuits, and an electron beam for forming images on the display surface in response to the video signals coupled to the input terminal 372. The display electron beam is positioned by the deflection circuits in response to the horizontal and vertical sync. pulses received from the TV camera 50.

Referring again to the horizontal error detector circuit 200 shown in FIG. 1B, the switch 232 has a second input terminal 233 which couples a current from a resistor 235 to the input terminal 234 of the operational amplifier 236 when switch 232 is in the position opposite from that shown. The resistor 235 is connected to the wiper of a potentiometer 237 which is coupled between a junction 238 and a resistor 241. The resistor 241 is coupled to a suitable source of negative voltage and a resistor 243 couples the junction 239 to a suitable source of positive voltage. Also the position voltage $P_H$ is coupled from the terminal 240 through a resistor 245 to the junction 239. It is to be noted at this time that in manual operation (switch 232 in the opposite position from that shown) the current coupled through the resistor 235 is integrated by the integrator 231 and the value of the voltage $P_H$ is regulated such that the potential at the wiper element of potentiomter 237 is driven to zero potential.

The vertical error detector 250 includes a potentiometer 253 and a switch 257 which are connected in a manner identical to that just described for the horizontal error detector 200 except that the position voltage $P_V$ is coupled through a summing resistor to the potentiometer 253.

Figure 3:
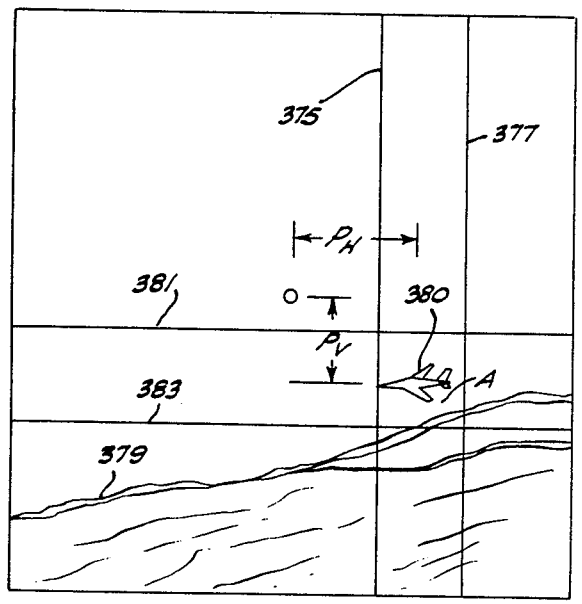
FIG. 3 is a diagram of the screen of the display tube, that may be utilized in the system of FIGS. 1A and 1B, for explaining the operation of the system in accordance with the invention.

It will be recalled that the video signal at the output terminal of the video amplifier 82 is representative of the relative energy intensity of the portion of the sensor being scanned by the video output circuit of the TV camera 50. This video signal is summed with timing signals, representative of the leading and trailing edges of said horizontal and vertical gating signals produced by said crosshair generator 350, and coupled to the signal input terminal 372 of the TV monitor 374. In response to this input signal at the terminal 372, TV monitor 374 produces images on a display surface which are synchronized by the horizontal and vertical sync. pulses and which are representative of the relative intensity of the energy focused on the sensor of TV camera 50. Also the display surface of monitor 374 includes a pair of vertical intensified lines representative of the leading and trailing edges of the horizontal gating pulses and a pair of horizontal intensified lines representative of the leading and trailing of edges of the vertical gating pulses. A representative diagram of the display surface of the TV monitor 374 is shown in FIG. 3 wherein the leading and trailing edges of said horizontal gating signals are represented by vertical intensified lines or crosshair designated 375 and 377 respectively. The leading and trailing edges of said vertical gating signals are represented by horizontal intensified lines designated 381 and 383 respectively. Also included in the representative display of FIG. 3 are images of terrain, 379, within the field view of said TV camera 50 and a target image 380.

The system of FIGS. 1A and 1B has two modes of operation, manual (acquisition) and automatic (track). The operation of the system is initiated in the acquisition mode which will be discussed with reference to FIGS. 1A, 1B and 3. An operator, while observing the display tube screen shown in FIG. 3 selects an object to be tracked by superimposing the intersection of the vertical 375, 377 and horizontal 381, 383 crosshairs around the designated object image 380 on the TV monitor 374. These cross-hairs are manually positionable by movement of the wiper elements of potentiometers 237 and 253 (FIG. 1B) when the switches 232 and 257 are in the opposite position from that shown. In this acquisition mode the output signals $P_H$ and $P_V$ of error detectors 200 and 250 are determined by the position of the controls 237 and 252. As shown in FIG. 3 the signals $P_V$ and $P_H$ are the voltage analogs of the positions of the center of the horizontal and vertical crosshairs, respectively, relative to the center of the display tube screen.

After the operator has designated the object to be tracked by the acquisition procedure just described the automatic (track) mode is initiated by manually inactivating switches 232 and 257 to the positions shown in FIG. 1B. In this mode of operation, the center of the rectangle formed by the intersection of the display crosshairs automatically tracks the approximate centroid of the designated image on the monitor display of FIG. 3 and the voltages $P_V$ and $P_H$ are indicative of the vertical and horizontal centroids respectively of the image relative to the center of the sensor of TV camera 50 as well as the center of the display tube.

The basic timing of the system of FIG. 1A and 1B as well as the unique features of the mean level processor 80 and the AGC unit 150 may be explained by reference to the signal waveforms of FIGS. 4 and 5 as well as to the system diagram of FIGS. 1A and 1B. Although a conventional TV timing sequence has been selected for the embodiment of FIGS. 1A and 1B, any suitable timing base could be utilized in accordance with the principles of the invention. One of the basic timing signals of the system of FIGS. 1A and 1B are the vertical sync. pulses shown by a waveform 61 of FIG. 5. These vertical sync. pulses developed at a terminal 60 of TV camera 50 (FIGS. 1A and 1B) control the vertical scan of the TV monitor 374 as well as the reset sequence of the vertical error detector integrator 252. The horizontal sync. pulse of a waveform 59 (FIG. 4) controls the horizontal scan timing of TV monitor 374 as well as the reset periods of integrator 208 of the horizontal error detector 200. The horizontal and vertical deflection waveforms produced by the TV camera 50 are shown in waveforms 54 (FIG. 4) and 57 (FIG. 5). As described previously, these deflection waveforms provide the synchronization basis for the gate generator 300. The basic timing of the vertical gating signals at terminal 340 of gate generator 300 are shown by a waveform 341 of FIG. 5 as 0.65 milliseconds (m sec.) which is approximately the period of ten horizontal readout scans of TV camera 50. However, it will be understood that the duration of the horizontal and vertical gating signals are designed parameters that may be selected for any given system application.

Figure 4:
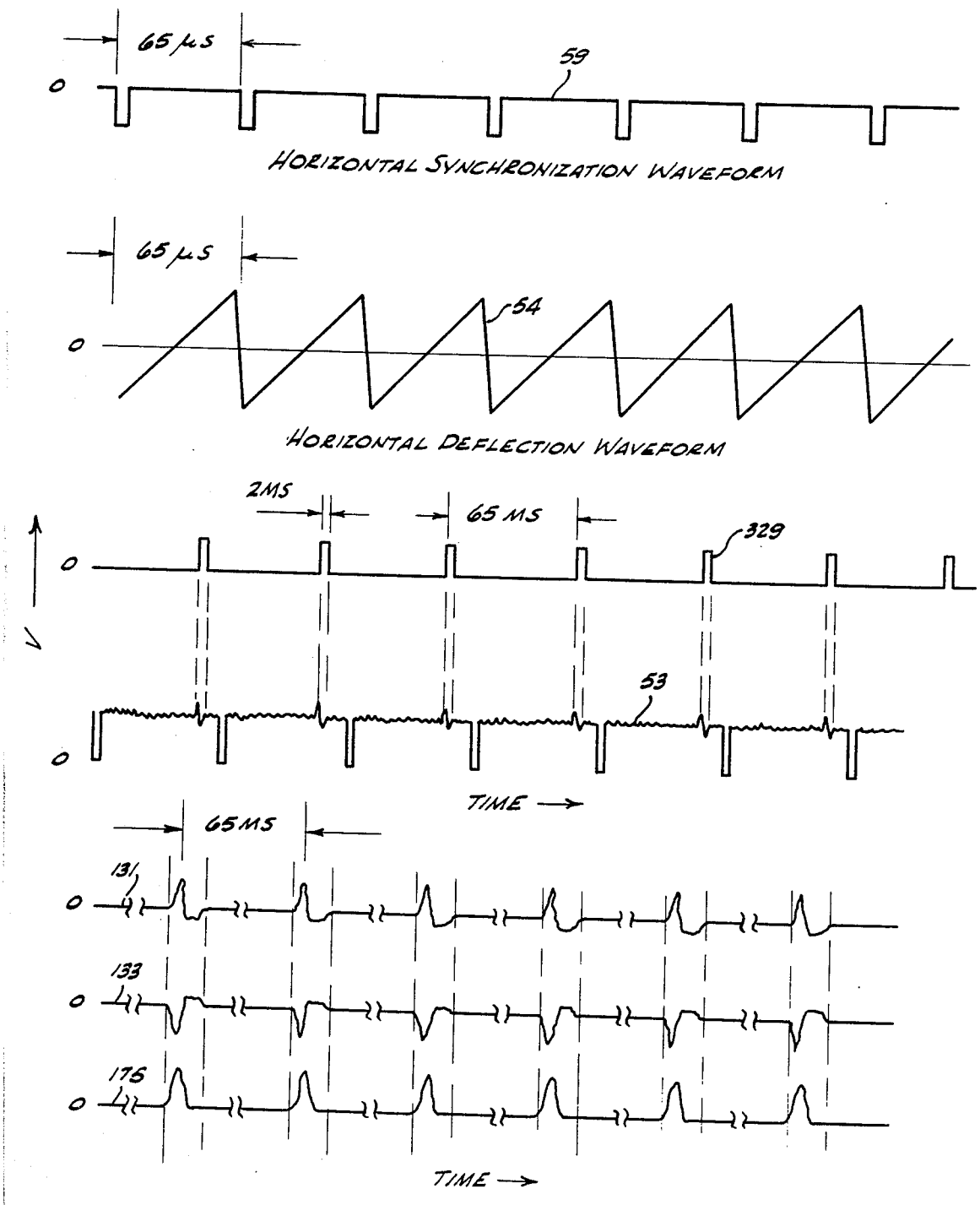

Referring now to FIGS. 1A, 1B and 4, the video signal produced at terminal 52 of camera 50 and the horizontal gating signal at terminal 328 are shown by waveforms 53 and 329, respectively. As previously described, the signal of waveform 53 is gated in response to the horizontal gating signal in the mean level detector 80 to eliminate undesirable signals that are not in close time (space) coincidence with a selected target. Also the video signal of waveform 53 is processed in the mean level detector in such a manner that the average value of the gated signal is at zero or ground potential, as shown by a waveform 131. The time scale of the gate signal has been expanded in waveforms 131, 133 and 175 in the interest of clarity. It is to be recalled that the waveform 133 at the output of amplifier 132 is of opposite polarity from that of waveform 131 at the output of amplifier 130 and by means of switch 134 the operator may select the output of either of the aforementioned amplifiers. Since the AGC unit 150 only allows the positive position of the signal coupled to the switch 134 to be processed by the error detectors 200 and 250, target tracking may be enhanced by contrast selection. For example the signal of waveform 131 may be representative of a portion of the horizontal scan pattern designated by the letter "A" in FIG. 3. The positive peak of the waveform 131 would then correspond to the aircraft 380 which is of higher relative intensity than the nearby terrain. By selecting the output of the signal of amplifier 130 at switch 134, only the signal representative of the aircraft (as shown by waveform 175) would be coupled by the AGC unit to the error detectors 200 and 250. Also, by selecting the output signal of amplifier 132, only targets of negative contrast relative to the means value of the gate video signals as indicated by the waveform 133 will be processed as targets.

The principles in accordance with the invention will be better understood by a one-dimensional analysis of the derivation of the position voltage, $P_H$, which is representative of the target position relative to the horizontal center of the sensor screen of the TV camera 50. Although this analysis is directed to the horizontal dimension, it will be readily observed that a similar analysis would be applicable to the vertical tracking dimension. For ease of understanding, reference is now directed to FIG. 6 which shows a block diagram of the system of FIGS. 1A and 1B for the horizontal tracking dimension. It will be recalled that signal, $S(t)$, is coupled from the output terminal of the AGC unit 150 to the signal input terminal of the horizontal error detector 200. The signal $S(t)$ is the video signal developed by the TV camera 50 after processing by the means level processor 80 and the AGC unit 150. As explained previously, the signal $S(t)$ is processed by two parallel circuit paths in the error detector 200. In one circuit path the signal $S(t)$ is gated by a gating signal $G(t)$ prior to being integrated by reset integrator 208 which is reset to zero potential at the occurrence of the horizontal sync. pulse coupled from the TV camera 50. The output signal of integrator 208 is gated in response to the gating signal $G(t)$ and then coupled to a subtraction circuit 221 wherein it is substrated from the signal $S(t)$ which also is gated by the signal $G(t)$. The voltage at the subtraction circuit output terminal is integrated to produce the position voltage $P_H$. The gating signal $G(t)$ may be expressed as $u(t-t_1+\tau/2) - u(t-t_1-\tau/2)$, where $\tau$ is the time duration of the horizontal gating signal the center of which occurs at $t = t_1$, $t$ represents the time variable and $u(x)$ is the unit step function at $x = 0$. The output voltage $P_H$ at some time $t_2$ where $t_2 > t_1 + \tau/2$ is given by:

$$P(t_2) = P(t_0) + K_2 \int_{t_0}^{t_2} \left[ G(t) S(t) - G(t) K_1 \int_{t_0}^{t} G(t') S(t') dt' \right] dt$$

where $t_0$ is the time of occurrence of the reset pulse (horizontal sync. pulse), $K_1$ is the gain constant of integrator 212 and $K_2$ is the gain constant of integrator 231. Therefore:

$$\Delta P \equiv P(t_2) - P(t_0) = K_2 \int_{t_0}^{t_2} G(t) S(t) dt - K_2 \int_{t_0}^{t_2} G(t) K_1 \int_{t_0}^{t} G(t') S(t') dt' dt$$

$$\Delta P = K_2 \int_{t_1-\tau/2}^{t_1+\tau/2} S(t) dt - K_2 \int_{t_1-\tau/2}^{t_1+\tau/2} K_1 \int_{t_1-\tau/2}^{t} S(t') dt'$$

$$\Delta P = K_2 \int_{-\tau/2}^{+\tau/2} S(t+t_1) dt - K_1 K_2 \tau/2 \int_{-\tau/2}^{+\tau/2} S(t'+t_1) dt' + K_1 K_2 \int_{-\tau/2}^{+\tau/2} t S(t+t_1) dt$$

The gain constant $K_1$ of the integrator 208 is set equal to $2/\tau$, so that:

$$\Delta P = \frac{+2K_2}{\tau} \int_{-\tau/2}^{+\tau/2} t S(t+t_1) dt.$$

It will be recalled that the $$\int_{-\tau/2}^{+\tau/2} S(t+t_1) dt$$

is maintained a constant value ($K_3$) due to processing by the AGC unit so that:

$$\Delta P = \frac{2 K_2 K_3}{\tau} \frac{\int_{-\tau/2}^{+\tau/2} t S(t+t_1) dt}{\int_{-\tau/2}^{+\tau/2} S(t+t_1) dt} = \frac{2 K_2 K_3}{\tau} \frac{\int_{t_1-\tau/2}^{t_1+\tau/2} (t-t_1) S(t) dt}{\int_{t_1-\tau/2}^{t_1+\tau/2} S(t) dt}.$$

If $S(t) \equiv 0$ for $|t-t_1| > \tau/2$ then:

$$\Delta P = \frac{2 K_2 K_3}{\tau} \frac{\int_{-\infty}^{+\infty} (t-t_1) S(t) dt}{\int_{-\infty}^{+\infty} S(t) dt} = \frac{2 K_2 K_3}{\tau} \left[ \overline{T} - t_1 \right],$$

-continued $$\text{where } \bar{t} \equiv \frac{\int_{-\infty}^{+\infty} t\, S(t)\, dt}{\int_{-\infty}^{+\infty} S(t)\, dt} = \text{"Centroid of } S(t)\text{"}.$$

Thus ΔP is proportional to the deviation of the center of the gate from the centroid of S(*t*) if S(*t*) = 0 outside of the gate, and if K₁ is chosen equal to 2/τ while the integral of S(*t*) is maintained constant. It is noted from the preceding analysis that the centroid in a given dimension is a function of both the energy content of the signal and the distribution of this energy in the given dimension.

Figure 8:
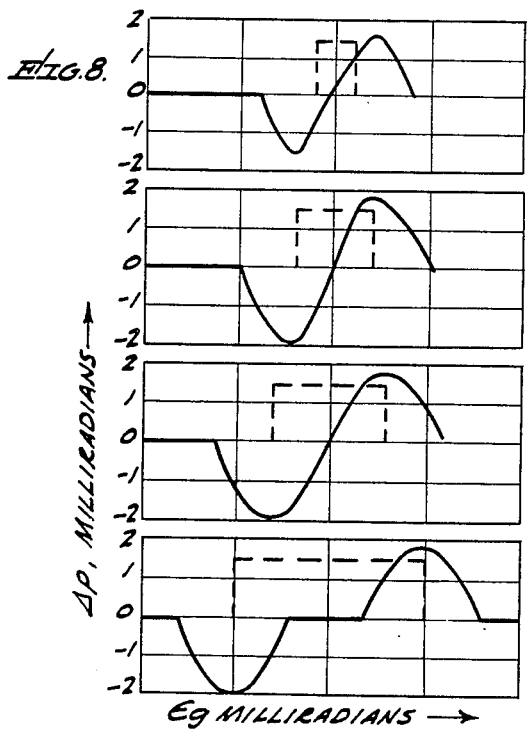
FIG. 8 is a diagram showing the error characteristics of the system in accordance with the invention.
Figure 7:
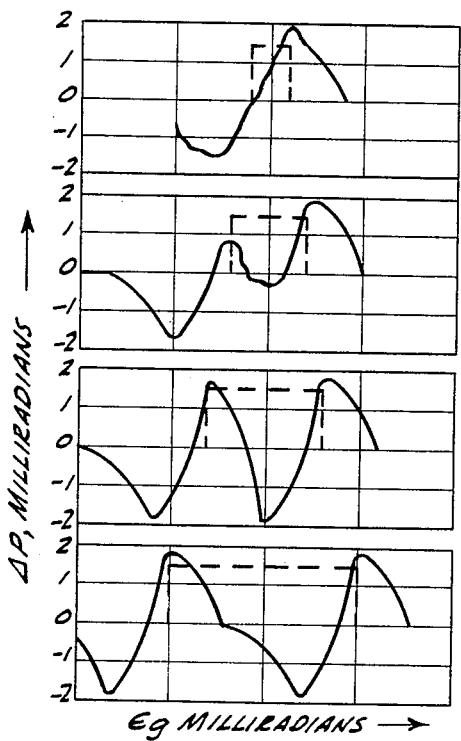
FIG. 7 is a diagram showing the error characteristics of a contrast gradient type tracking system.

It will be noted from the previous derivation that the error detector just described not only compares the energy on alternate sides of the center of the tracking gate, but in addition weights (modifies the relative value of) this energy as a function of its relative distance from the gate center. It has been found that this procedure produces error characteristics which result in a tracker with greater accuracy and stability than prior systems. For a given target video waveform, an error characteristic can be plotted by showing the shift in gate position per sample, ΔP, as a function of gate error, Eg. Reference is now directed to FIGS. 7 and 8 wherein the comparison purposes FIG. 7 shows error characteristics of a conventional gradient type system and FIG. 8 shows the error characteristics for a centroid tracking system in accordance with the principles of the invention. Both FIGS. 7 and 8 are representative of the variation of the error characteristics with decreasing range as the target profile (shown at dashed lines) grows with respect to a 6 milliradian gate. It may be seen that compared to the irregular shape and double null of the gradient system, the centroid system offers a well behaved error characteristic shape which is very important for tracker stability. If the error curve has multiple null points as exhibited by the curves of FIG. 7, the tracker gate may oscillate from null to null, therefore reducing accuracy and stability. Also, while the constant gradient signal processing used in some of the prior art trackers tend to track a target edge, the system in accordance with the subject invention will track the target centroid so long as the track gate size is larger than the target. If the target size is larger than the gate size, the tracker of the subject invention will tend to drift towards the target edge but its aim point will always be within the target outline by at least one-half gate dimension.

Figure 9:
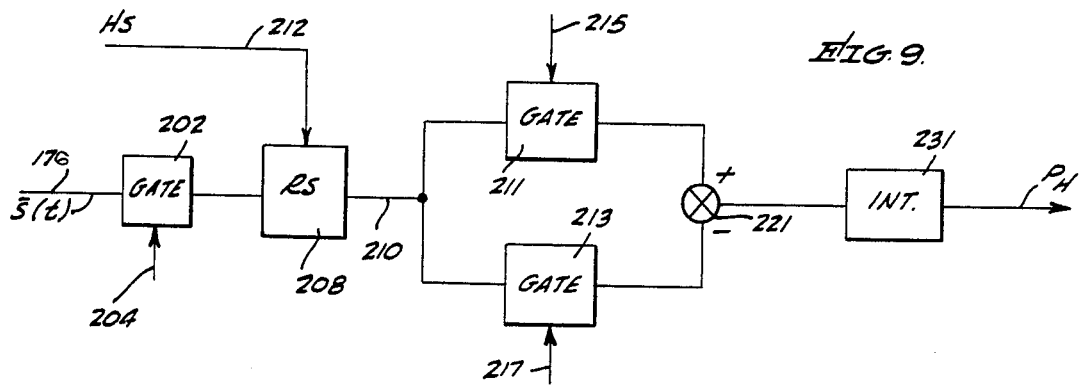
FIG. 9 is a block diagram for explaining a second embodiment of the error detector in accordance with this invention.

Although only one embodiment of the error detector in accordance with the invention has been described relative to the system in FIG. 1, it will be appreciated that other mechanizations may be employed in accordance with the principles of the invention. The basic characteristics of these various methods of formulation of the error detector is the use of two integrators in series with two or more gates that are relatively synchronized. The first gate may be turned on or conducting for the horizontal gate period during which time the position of the target energy is sampled. For example the horizontal error detector shown in FIG. 9 is coupled to the input terminal 176 which receives the output signal $\bar{S}(t)$ from the AGC unit 150 (FIG. 1B) and applies the signal to the gate circuit 202. The output signal of the gate circuit 202 is then coupled to the input of the reset integrator 208 as explained previously relative to the system of FIG. 1. The output signal at the terminal 210 of the reset integrator 208 is connected in parallel to the input circuits of conventional video gates 211 and 213. The signal at the output terminal of the video gates are subtracted in the conventional subtraction circuit 221 and then coupled to the input of the integrator 231. As was described for the system of FIGS. 1A and 1B, the output of the integrator 231 is the positioned voltage $P_H$ which controls the horizontal gate position. The resulting error characteristics of the system of FIG. 9 is dependent on the timing and duration of the gating signals which control the gates 211 and 213 at respective terminals 215 and 217 relative to the horizontal gating signal which activates gate 202 at the terminal 204. The first integrator 208 converts the target energy into a signal which is a function of both the target energy content and the position (time of occurrence) of this energy relative to the horizontal tracking gate. Gates 211 and 213 sample the output signal of integrator 208 according to a predetermined timing relationship so that the integral of the difference of the output signals of these gates follow a desired response function. For example, the gate timing shown in FIG. 10 results in an impulse error characteristic shown in FIG. 11 which is identical to the impulse response of the error detector described relative in FIGS. 1A and 1B. The synchronization of the gates shown by the waveforms of FIG. 10 is such that during a horizontal gate period gate 211 is open and transmits the output potential of the reset integrator 208 to the summing point 221. During this period the parallel gate 213 is closed. At the end of the horizontal gate period gate 211 is closed and gate 213 is opened and presents the reset integrator output voltage to the summing point 221 and hence to the summing integrator 231 for a period equal to one-half the horizontal gate period with a polarity reversed from that presented by the channel passing through gate 221. In FIG. 10 the gate waveforms are identified by reference numerals which are similar to the gate terminals that the signals of the characteristics shown control, except that the subscript *a* is added thereto. The waveforms of FIG. 12 shows a modification of the timing gate sequence that produces a modified centroid impulse error characteristic as shown in FIG. 13, which waveforms have the subscript *b* added thereto. Modified error curves may also be generated with the embodiment of FIG. 9 by varying both the gate timing sequence and by varying the relative amplitude gain factors of the two parallel channels. In this more general instance, the appropriate error characteristic is one in which the output signal $P_H$ remaining on the final integrator at the termination of each position measurement period is a constant when the input is an impulse signal occurring in the center of the horizontal gate period. This requirement is satisfied whenever the products of the amplitude gain factor and the time in which the controlled gate is open subsequent to the midpoint of the horizontal gate period are the same for each channel. An additional design principle of this modified error detector which is generally desirable but not unconditionally required is that the error characteristic be symmetric about the midpoint of the gate period. It will be appreciated that the error detector in accordanace with the principles of the invention, may be mechanized for whatever tracking response that is most suitable for a given expected target profile variation and is not limited to the centroid and modified centroid embodiment specifically described herein.

The tracking system in accordance with the principles of the invention may be utilized in such applications as target detection and armament control or for missile guidance in air-to-air, ground-to-air or ground-to-ground missiles. For example the system of FIG. 14 shows a homing missile terminal guidance system incorporating the principles of the invention. The operator may select the object to be tracked by utilizing the acquisition and track procedure described previously. The tracking system of FIGS. 1A and 1B, exclusive of TV camera 50 and TV monitor 374, is designated unit 401 in FIG. 14. In response to the video signals of TV camera 50, tracker unit 401 provides output voltage $P_V$ and $P_H$ at terminals 403 and 405 which represent the approximate vertical and horizontal centroid, respectively, of the target image relative to the TV camera field of view. These signals $P_V$ and $P_H$ may be utilized by any suitable conventional missile terminal guidance system to direct the flight path of the missile after launch. For example, referring to FIG. 14 the elevation tracker reference potential $P_V$ at the terminal 403 is processed by a conventional electronic servomechanism control amplifier 407 and then coupled on a lead 409 to a conventional gyroscope torquer unit 410. The free gyroscope unit 419 is mechanically precessed by the action of the torque unit 410. The gyroscope unit 419 may be of any suitable conventional type such as that shown in FIG. 10-5 (a) page 272 of the text entitled, "Guided Missile Engineering" published by McGraw-Hill Book Company, New York. The force exerted by the torquer unit 410 is such as to precess the gyroscope in the elevation angular direction thereby changing the field of view of the TV camera 50, which is physically attached to the gyroscope unit 419. The resulting angular motion of the TV camera tends to point the optical axis more towards the vertical position of the designated object, therefore resulting in a decrease of the elevation tracker reference potential at the terminal 403.

In a similar manner the azimuth tracker reference potential $P_H$ at a terminal 405 is processed by a conventional electronic servomechanism control amplifier 411 and is then coupled on a lead 413 to a conventional gyroscope torquer unit 414. The force exerted by the torquer unit 414 is such as to precess the gyroscope 419 in the azimuth angular direction and thereby change the field of view of the TV camera 50. The resulting angular motion of the TV camera tends to point the optical axis more towards the horizontal position of the designated object, resulting in a decrease in the azimuth tracker reference potential at the terminal 405.

Also the elevation tracker reference potential at the terminal 403, $P_V$ is coupled on a lead 415 to a suitable conventional missile elevation control system 421. In response to the signal $P_V$ the system 421 mechanically drives the missile elevation control surfaces 425. This outer servo control loop, which is closed by control surface 425, tends to null the line of sight angle of the designated object with respect to the missile velocity vector.

In a similar manner, the tracker azimuth reference potential at the terminal 405 is coupled on a lead 417 to a suitable missile azimuth control system 427 which drives the missile azimuth control surface 431 and thereby closes the outer servo loop in the horizontal direction.

It is to be noted that the frequency response of the servo loop comprising the TV camera 50 and tracker system 401 is usually much higher than that of the control loop for positioning the camera 50 and gyroscope 419 combination and that the servo loop controlling the missile steering surfaces conventionally possesses the longest time response.

Although but one embodiment of this invention has been described herein, it will be appreciated by those skilled in the art that other arrangements may be utilized in accordance with the principles of this invention. For instance, variations of the gating signals relative timing sequence and gate duration may be utilized to produce numerous error characteristic functions other than the centroid and modified centroid functions illustrated herein. Also, since the principles of this invention are unaffected by the spectral band of the sensor element, any suitable sensor, for example, infrared or ultra-violet types may be used instead of the TV camera. Although in the illustrated system the target is tracked in two dimensions, it is to be understood that the principles of the invention include systems operating in one or two dimensions. Further, it is noted that the term space is to include any portion of the atmosphere or of outer space.

Thus, there has been described a tracking system that determines the location of a designated object relative to the field-of-view of a sensor. The system produces improved tracking accuracy and stability over large variations of target images and reduces the affects of false targets of different intensity levels.

What is claimed is:

1. A system for determining with respect to an optical axis the angular location of an object in space in response to energy received therefrom comprising in combination:

transducer means, responsive to energy from a sector of said object, for optically scanning increments of area of said object with respect to the optical axis and developing area signals that are ampltidue representative of the relative intensity of the energy received from said increments of area;

gate generator means, coupled to the transducer means, for developing a plurality of gating signals; and error detection means, connected to the gate generator means, for developing position signals representative of the angular location of said object with respect to the optical axis, said error detection means including a first integrator and a second integrator serially gated to said first integrator.

2. The system as stated in claim 1, including:

a mean level processor interposed in circuit between said transducer means and said first integrator.

3. A system for tracking with respect to an optical axis the angular location of an object in space in response to energy received therefrom comprising transducer means, responsive to energy from a sector in space including said object, for sequentially developing area signals having an amplitude representative of the relative intensity of the energy received from increments of area of said object, a feedback circuit having an input terminal and an output terminal, gate generator means coupled to said transducer means and said output terminal of said feedback circuit and controlled by said feedback circuit for developing a plurality of gating signals that are synchronized with the angular location of said object, and error detector means having an input circuit and an output circuit with said input circuit coupled to said transducer means and to said gate generator means and said output circuit coupled to the input terminal of said feedback circuit, said error detector means responding to said area signals and said gating signals for developing position signals at said output circuit, said error detector means including first and second integrators and a gated subtraction network coupled between said first and second integrators.

4. The system as set forth in claim 3 with said first integrator having an output circuit and having an input circuit coupled to said input circuit of said error detector means, said gated subtraction means having a first input signal circuit coupled to said output circuit of said first integrator, having a second signal input circuit coupled to the input circuit of said error detector means, having a gating signal input circuit coupled to said gate generator means and having an output circuit means for developing a signal that is representative of the difference between said area signals and the integral of said area signals, and said second integrator having an input circuit coupled to said output circuit of said gated subtraction means and an output circuit coupled to said input terminal of said feedback circuit.

5. A system for determining with respect to an optical axis the angular location of an object in space in response to energy received therefrom comprising transducer means, responsive to energy from a sector in space including said object, for optically scanning increments of area of said object with respect to the optical axis and developing area signals that are amplitude representative of the relative intensity of the energy received from said increments of area, a feedback circuit having an input terminal and an output terminal, gate generator means coupled to said transducer means and said output terminal of said feedback circuit and controlled by said feedback circuit for developing a plurality of gating signals that are synchronized to the angular location of said object, and error detector means for producing position signals representative of the angular location of said object with respect to the optical axis, said error detector means having an input circuit coupled to said transducer means and said gate generator means and having an output circuit coupled to said input terminal of said feedback circuit, said error detector means including at least two gated integrators for developing the position signals, each of said integrators including, a first integrator having an input circuit coupled to the input circuit of said error detector means and having an output circuit, gated subtraction means having a signal input circuit coupled to said output circuit of said first integrator, having a gating signal input circuit coupled to said input circuit of said error detector means and having an output circuit, said gated subtraction means receiving an input signal and developing an output signal that is representative of the difference of sequentially gated segments of said input signal, and a second integrator having an input circuit coupled to said output circuit of said gated subtraction means and having an output circuit coupled to said input terminal of said feedback circuit.

6. A system for determining with respect to an optical axis the angular location of an object in space in response to energy received therefrom comprising transducer means, responsive to energy from a sector in space including said object, for optically scanning increments of area of said object with respect to the optical axis and developing area signals that are amplitude representative of the relative intensity of the energy received from said increments of area, a feedback circuit having an input terminal and an output terminal, gate generator means coupled to said transducer means and said output terminal of said feedback circuit and controlled by said feedback circuit for developing a plurality of gating signals that are synchronized to the angular location of said object, and error detector means for producing position signals representative of the angular location of said object with respect to the optical axis, said error detector means having an input circuit coupled to said transducer means and said gate generator means and having an output circuit coupled to said input terminal of said feedback circuit, said error detector means including at least two gated integrators for developing the position signals, each of said integrators including, a first integrator having an input circuit coupled to the input circuit of said error detecting means and having an output circuit, first and second gating means each having an input circuit coupled to the output circuit of said first gating means, having a gating signal input circuit coupled to said gate generator means and having an output terminal, subtracting means having an input circuit coupled to the output terminals of said first and second gating means and having an output circuit, and a second integrator having an input circuit coupled to the output circuit of said subtracting means and having an output circuit coupled to the input terminal of said feedback circuit.

7. A system for determining with respect to an optical axis the angular location of an object in response to energy received therefrom comprising transducer means, responsive to energy from a sector in space including said object, for optically scanning increments of area of said object with respect to the optical axis and developing area signals that are amplitude representative of the relative intensity of the energy received from the increments of area, a feedback circuit having an input circuit and an output circuit, gate generator means coupled to said transducer means and said output circuit of said feedback circuit and controlled by said feedback circuit for developing a plurality of gating signals that are synchronized to the angular location of said object relative to the optical axis, processor means having an input circuit coupled to said transducer means and said gate generator means, and having an output signal circuit, for providing gated area signals that have a mean amplitude value adjusted to a predetermined value and a selectable polarity, gain control means having an input circuit coupled to said output signal circuit of said processor means and having an output signal circuit for providing single polarity gated area signals whereby the integral of said signals is maintained at a predetermined constant value, and error detector means coupled to said gain control means and said gate generator means and responsive to said area signals and said gating signals for developing position signals, said error detector means further coupled to said input circuit of said feedback circuit, said error detector means including a plurality of serially gated integrators.

8. A system for determining with respect to an optical axis the angular location of an object in response to energy received therefrom comprising transducer means, responsive to energy from a sector in space including said object, for optically scanning increments of area of said object with respect to the optical axis and developing area signals that are amplitude representative of the relative intensity of the energy received from the increments of area, a feedback circuit having an input circuit and an output circuit, gate generator means coupled to said transducer means and said output circuit of said feedback circuit and controlled by said feedback circuit for developing a plurality of gating signals that are synchronized to the angular location of said object relative to the optical axis, processor means having an input circuit coupled to said transducer means and said gate generator means, and having an output signal circuit, for providing gated area signals that have a mean amplitude value adjusted to a predetermined value and a selectable polarity, gain control means having an input circuit coupled to said output signal circuit of said processor means and having an output signal circuit for providing single polarity gated area signals whereby the integral of said signals is maintained at a predetermined constant value, and error detector means coupled to gain control means and said gate generator means and responsive to said area signals and said gating signals for developing position signals, said error detector means further coupled to said input circuit of said feedback circuit, said error detector means including at least two gated integrators, each of said integrators including, a first integrator having an output circuit and having an input circuit coupled to said input circuit of said error detector means, gated subtraction means having a first input signal circuit coupled to said output circuit of said first integrator, having a second signal input circuit coupled to the input circuit of said error detector means, having a gating signal input circuit coupled to said gate generator means and having an output circuit means for developing a signal that is representative of the difference between said area signals and the integral of said area signals, and a second integrator having an input circuit coupled to said output circuit of said gated subtraction means and having an output circuit coupled to said input circuit of said feedback circuit.

9. A system for determining with respect to an optical axis the angular location of an object in response to energy received therefrom comprising transducer means, responsive to energy from a sector in space including said object, for optically scanning increments of area of said object with respect to the optical axis and developing area signals that are amplitude representative of the relative intensity of the energy received from the increments of area, a feedback circuit having an input circuit and an output circuit, gate generator means coupled to said transducer means and said output circuit of said feedback circuit and controlled by said feedback circuit for developing a plurality of gating signals that are sychronized to the angular location of said object relative to the optical axis, processor means having an input circuit coupled to said transducer means and said gate generator means, and having an output signal circuit, for providing gated area signals that have a mean amplitude value adjusted to a predetermined value and a selectable polarity, gain control means having an input circuit coupled to said output signal circuit of said processor means and having an output signal circuit for providing single polarity gated area signals whereby the integral of said signals is maintained at a predetermined constant value, and error detector means coupled to said gain control means and said gate generator means and responsive to said area signals and said gating signals for developing position signals, said error detector means further coupled to said input circuit of said feedback circuit, said error detector means including at least two gated integrators, each of said integrators including, a first integrator having an input circuit coupled to said input circuit of said error detector means and having an output circuit, gated subtraction means having a signal input circuit coupled to said output circuit of said first integrator, having a gating signal input circuit coupled to said gate generator means and having an output circuit for developing an output signal that is represenative of the amplitude of sequentially gated segments of said input signal, and a second integrator having an input circuit coupled to said output circuit of said gated subtraction means and having an output circuit coupled to said input circuit of said feedback circuit.

10. In a system for tracking a target having a sensor that provides received signals from the target and utilizing vertical and horizontal detectors for determining the center of a portion of said target by signal weighting, each of said detectors comprising in combination:

a first integrator; and a second integrator serially gated to said first integrator.

11. The invention as stated in claim 10, including:

a mean level processor, electrically interposed between said sensor and first integrator, and gated to said first integrator.

* * * * *